Nov. 14, 1967  F. S. BUCHWALD  3,353,047
BRUSH CONSTRUCTION

Filed April 12, 1965  2 Sheets-Sheet 1

INVENTOR.
FRANK S. BUCHWALD
BY Bosworth, Sessions,
Hewston & Knowles
ATTORNEYS

Nov. 14, 1967   F. S. BUCHWALD   3,353,047
BRUSH CONSTRUCTION

Filed April 12, 1965   2 Sheets-Sheet 2

INVENTOR.
FRANK S. BUCHWALD
BY Bosworth, Sessions,
Herström & Knowles
ATTORNEYS

United States Patent Office 3,353,047
Patented Nov. 14, 1967

3,353,047
BRUSH CONSTRUCTION
Frank S. Buchwald, Cleveland, Ohio, assignor to Lear Siegler, Inc., Santa Monica, Calif., a corporation of Delaware
Filed Apr. 12, 1965, Ser. No. 447,302
4 Claims. (Cl. 310—247)

ABSTRACT OF THE DISCLOSURE

An electrical brush and brush holder construction for dynamoelectric machines and, in particular, for use on flooded dynamoelectric machines or such machines having fluid in intimate contact with the internal parts of the machines.

---

This invention relates to an electrical brush and brush holder construction and configuration for dynamoelectric machines. In particular, it relates to brushes and brush holders for use on flooded dynamoelectric machines or such machines having fluid in intimate contact with the internal parts of the machines. Flooded direct current motors for driving pumps are an illustrative example of dynamoelectric machines operated in this way. The flooding of such motors may be advantageous because it eliminates the need for certain fluid seals between the motor cavity and the fluid passages of the pump; or, because it permits the passage of fluid through a driving motor and pump in series. Sometimes, fluid is circulated through a motor cavity in order to cool the internal parts of the motor. In other instances, the motor cavity is flooded or filled with fluid or a fluid atmosphere to provide controllable and/or controlled conditions therein and conditions other than those in which the motor might be operated.

For whatever reason the dynamoelectric machine is flooded or provided with a fluid atmosphere more viscous than air (other than air at normal atmospheric pressures), certain problems of brush operation are encountered which are not present in machines running just in air. For example, when a direct current dynamoelectric machine operates in air, good seating of the brushes on the commutator can generally be insured by the application of a small amount of spring pressure on the brush. When fluids with viscosities greater than that of air are allowed to circulate and, indeed, forced to circulate in and around and in intimate contact with the brushes and commutator of a dynamoelectric machine, the more viscous fluids tend to be carried in the form of a film on the rotating commutator and between the commutator and the surface of the brush bearing against and riding on the commutator. This moving fluid film develops a pressure which exerts a radially directed force on the commutator-engaging surfaces of the brushes tending to separate and to lift the brushes from the commutator. Such a film can prevent the brushes from making firm contact with the commutator and can produce a deleterious amount of brush bounce, chatter, and increased arcing between the brush and the commutator. As a result, the brush wear is extremely rapid.

The problem is generally not solved by increasing the spring pressure on the brushes and, in some cases, such an increase induces even more rapid wear because the force applied by the spring remains substantially constant while the fluid film pressure tending to separate the brush and the commutator varies with changes in various operating conditions.

When the temperature of the fluid flooding the machine increases, for example, the viscosity of the fluid decreases, resulting in a decrease of fluid film pressure and the force tending to lift the brushes. As a result, less force is required for opposing the fluid firm pressure at the higher fluid temperatures and lower viscosities so that the fixed spring pressure suitable at lower temperatures and higher viscosities becomes excessive and brush wear is greatly accelerated. Conversely, if the temperature should decrease and the fluid viscosity increase, there is a corresponding increase of fluid film pressure tending to separate the brush and commutator. This situation requires an amount greater than the original fixed amount of brush spring force in order to prevent brush bounce, chatter, and arcing and the resulting excessive brush wear.

The fluid film pressure tending to separate the brushes and commutator also varies with the area of contact between them and the speed of rotation of the commutator. In most applications, the area of contact remains substantially constant, but rotor speed may vary widely.

It is apparent, therefore, that the problem of brush lift produced by fluid film pressure cannot be solved by selection of a suitable brush spring when a range of commutator speeds and/or fluid viscosities are involved.

The general object of this invention is to provide means for overcoming the brush operating problems encountered in dynamoelectric machines operating under flooded or fluid atmosphere conditions and described above. An object is to provide a brush that rides on the commutator of a dynamoelectric machine smoothly and in good electrical contact when a suitable spring force is applied to the brush even when the brush is subjected to a force of a varying amount tending to lift it from the commutator. Still another object is to provide such a brush which suffers substantially less than the usual amount of wear experienced by conventional brushes under like or similar operating conditions. Yet another object is to provide such a brush and brush holder which, in combination, are able to provide good and relatively chatter-free current-conducting brush contact with the commutator of a flooded dynamoelectric machine, even under variable conditions of viscosity of the flooding fluid due to fluid temperature changes and/or the use of different fluids. Another object is to provide such a brush and brush holder which are able satisfactorily to accommodate very wide variations in the fluid film pressure acting between the brush and the commutator by employing a force generally proportional and inverse to changes in the fluid film pressure tending to separate the brush and commutator.

The means and manner of accomplishing the foregoing objects, as well as other features and advantages of the invention, will become apparent from the following description of a preferred and modified embodiment thereof taken together with the accompanying drawings in which.

Figure 1:
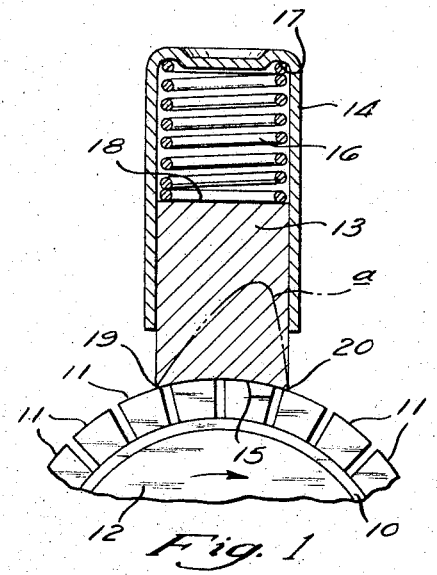
FIGURE 1 is an axially directed end view of a portion of a dynamoelectric machine commutator and a conventional brush and a brush holder in longitudinal cross section.
Figure 2:
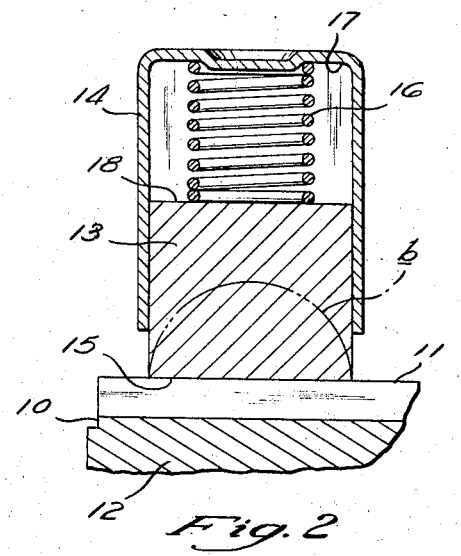
FIGURE 2 is a radially directed side elevation view in cross section of the commutator, brush, and brush holder shown in FIGURE 1.
Figure 3:
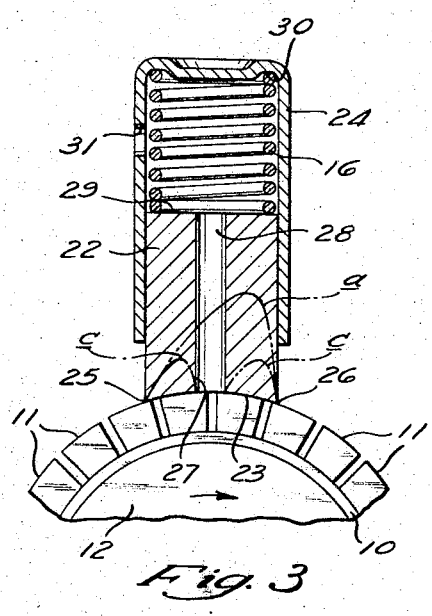
Figure 4:
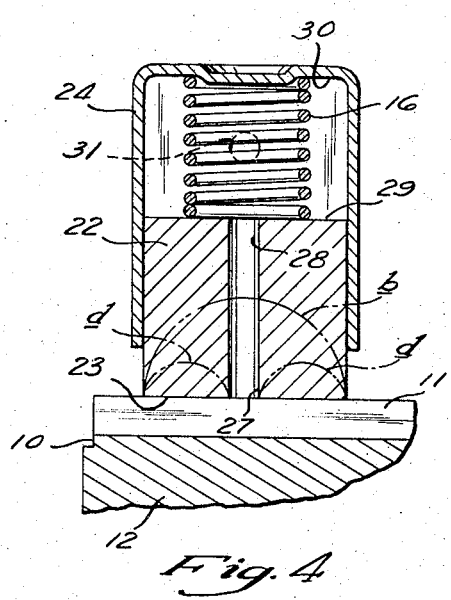
Figure 5:
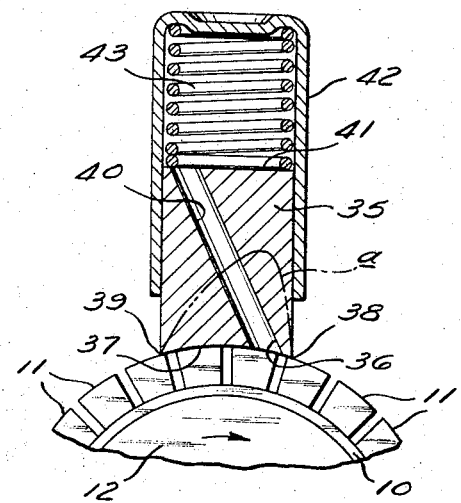
Figure 6:
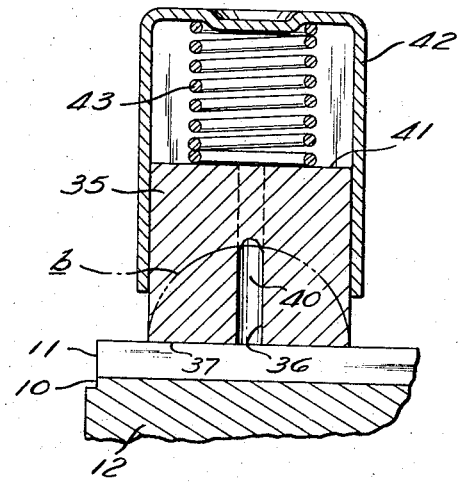
Figure 7:
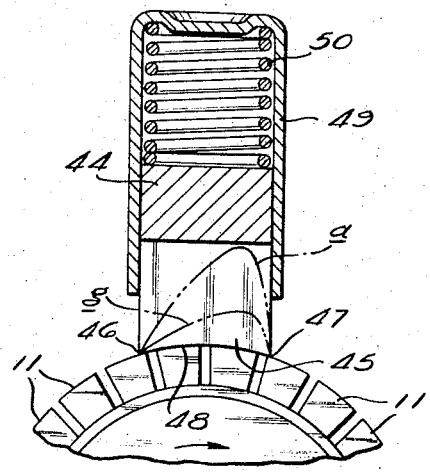
Figure 8:
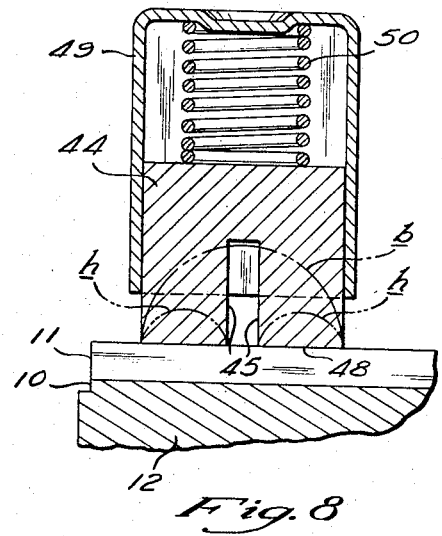

FIGURES 3 and 4 correspond to FIGURES 1 and 2, respectively, and show one form of brush and brush holder embodying this invention;

FIGURES 5 and 6 also correspond to FIGURES 1 and 2 but show another form of brush and brush holder combination embodying this invention; and FIGURES 7 and 8 also correspond in their views to FIGURES 1 and 2 but show yet a different form of brush and brush holder combination embodying this invention.

Similar numerals refer to similar parts throughout the several views of the drawings.

In FIGURE 1 is shown an axial end view of a portion of a conventional dynamoelectric machine commutator 10 having circumferentially spaced apart current-conducting segments 11 carried on a core or shaft 12. Commutator 10 is mounted for rotation as indicated by the arrow in FIGURE 1, for example, and segments 11 are connected electrically to various armature windings also mounted for rotation on the same shaft. Current is conducted to and from the rotating armature windings by means of current-conducting brushes, such as brush 13, slidably mounted within brush boxes, such as brush box 14, carried and supported on a stationary portion of the dynamoelectric machine. Brush 13 has a current-conducting surface 15 at one end of the brush body. Surface 15 is shaped and/or wears to conform to the cylindrical commutator 10 so that it has sliding current-conducting contact over substantially the entire area of end surface 15.

Brush 13 has a telescoping relationship with brush box 14 and has a sliding fit within the box. A brush spring 16, stressed in compression and acting between the closed end 17 of brush box 14 and the other end surface 18 of brush 13, acts to urge the brush out of its brush box so that commutator-engaging end surface 15 bears as continuously as possible against commutator 10.

The portion of commutator 10, and brush 13, brush box 14, and brush spring 16, described above and shown in FIGURE 1, are also shown in FIGURE 2, sectioned in the plane of the axis of rotation of commutator 10.

Also, the invention comprehends rotating current-conducing surfaces other than segmented commutators such as shown. The invention is useful in connection with brushes employed to conduct current to and from solid cylindrical current-conducting surfaces such as slip rings. It will be understood, therefore, that whenever "commutator" is used in this description or in the claims following it, all current-conducting surfaces adapted to have relative motion and current-conducting contact with respect to electric brushes are comprehended, including segmented commutators and slip rings. Also, it will be understood that the schematic representations of the rotating current-conducting elements of the dynamoelectric machine appearing in the accompanying drawings are intended to represent any current-conductor surface, including a conventional commutator and conventional slip rings.

As mentioned above, when the commutator and brushes of a dynamoelectric machine are operated in atmospheres other than air and particularly in fluid atmospheres more viscous than air at corresponding temperatures and pressures, a fluid film is formed and carried by the brushes on the rotating commutator. As a result of this fluid film, a fluid film pressure builds up between each brush and the commutator, tending to separate the two and to push the brush away from and out of current-conducting contact with the commutator. Sometimes, the fluid film and the resulting pressure causes the brush to chatter or to momentarily lift and otherwise to interrupt the continuous contact between the brush surface and the commutator, as well as to diminish the area of contact between them. It will be apparent, therefore, that the fluid film pressure can seriously reduce, impair, and even interrupt the flow of current between brush and commutator. Superimposed on brush 13 in FIGURES 1 and 2 are broken-line curves $a$ and $b$, representing the magnitude and distribution of the fluid film pressure. As shown in FIGURE 1, the pressure pattern is asymmetrical from leading edge 19 to trailing edge 20 of brush 13. At each of the edges, the pressure is essentially the same as the ambient pressure in and around the commutator. The peak pressure in the pattern as shown in FIGURE 1 is reached near the trailing edge.

As shown by curve $b$ in FIGURE 2, the pressure pattern from side to side or axially of the commutator is symmetrical, being substantially the same as ambient pressure at the sides of the brush and rising to a maximum about midway between the sides of the brush. Curves $a$ and $b$, described above, have been superimposed on the various forms of the invention as they appear in FIGURES 3 through 8 for purposes of comparison and as described below.

The absolute values of the fluid film pressures present in any particular dynamoelectric machine operating under a specified set of conditions will vary, of course, with the viscosity of the fluid atmosphere in which the commutator and brushes are operating, and with the relative velocity and the area of the engaged surfaces of the conductor and brushes. This viscosity of any particular fluid is, in turn, normally the function of temperature and, if interest in this case particularly, of the temperature of the fluid film between the brush and the commutator. The fluid film pressure is opposed by the force of brush spring 16 acting on the radially opposite end of brush 13. A suitable brush spring can somewhat minimize the deleterious effects otherwise produced by the fluid film pressure when the fluid film viscosity and the relative velocity of the engaged commutator and brush surfaces remain relatively constant. As the range of operating viscosities and/or pertinent relative surface velocities broadens, however, the fixed spring force is increasingly ineffective.

One form of brush and brush box construction and combination embodying this invention is shown in FIGURES 3 and 4. The views shown in these figures correspond to those in FIGURES 1 and 2.

In FIGURES 3 and 4, brush 22, having an outer surface including a current-conducting and conductor-engaging surface portion 23 bearing against commutator 10, is carried and supported telescopically within brush box 24 and urged against commutator 10 by brush spring 16. About midway between leading edge 25 and trailing edge 26 of brush 22, as well as midway between axial sides of brush 22, a hydrodynamic relief port 27 opens onto current-conducting surface portion 23. A pressure-transmitting passage 28 is connected to relief port 27 and extends through the body of brush 22 to end surface portion 29 radially opposite current-conducting surface portion 23. Thus, passage 28 establishes pressure-transmitting communication between current-conducting surface 23 and the inside of the brush box 24 between end surface 29 of the brush and the closed end 30 of the brush box. Brush box 24 is preferably ported as at 31 in the area between end surface 29 of the brush and the closed end of the brush box in order to further transmit fluid film pressure sensed at relief port 27 of the brush to the ambient pressure within the machine. The effect of relief port 27, pressure-transmitting passage 28 and port 31 in the brush box is to reduce the peak fluid film pressure encountered at any particular operating condition.

In FIGURES 3 and 4 are shown the pressure-magnitude-distribution curves $a$ and $b$ illustrating the pressures produced against the current-conducting surface of a brush as shown in FIGURES 1 and 2 and the corresponding curves $c$ and $d$ representing the pressure-magnitude distribution present with the structure and combination described and shown. It will be apparent that the peak fluid film pressure is materially reduced by the relief port in the current-conducting surface 23 and in communication with internal ambient pressure of the machine through passage 28 and port 31.

The construction shown and described in FIGURES 3 and 4 makes it possible to overcome the deleterious effects of a relatively much wider range of fluid film pressures than can be accommodated by conventional brush construction. Under certain more severe circumstances and operating conditions, it is preferred to employ a modified form of brush construction. The types of operating conditions under which this modified form of brush construction is useful are those encountered, for example, in a direct current motor and pump combination used for pumping substances having a wide range of viscosities such as artic-grade Diesel fuel oil at −65° F. and gasoline at 125° F. This modified construction is useful and effective under operating conditions involving thick, slushy, high viscosity fluids as well as highly volatile, vaporous fluids of low viscosity.

As shown in FIGURES 5 and 6, the modified brush 35 has a relief port 36 in current-conducting and conductor-engaging surface portion 37 and located closer to trailing edge 38 than the leading edge 39 of the brush and approximately in the area of the peak pressure conventionally experienced and as represented by curve a. A passage 40 connects relief port 36 to outer surface end portion 41 of brush 35. It will be noted, in FIGURE 5, that passage 40 opens onto end surface at a point generally radially opposite leading edge 39 of the brush. Passage 40, as seen in FIGURE 6, appears in section along only part of its full length from relief port 36 to end surface 41 because passage 40 is inclined with respect to the radial plane sectioning FIGURE 6. That part of pasage 40 not sectioned appears in broken lines.

Execpt for the open end through which brush 35 is telescopingly received, brush box 42 is generally closed in completely and not provided with any ports such as provided in brush box 24 in FIGURES 3 and 4. Therefore, fluid film pressure transmitted by passage 40 into brush box 42 tends to act against the end surface 41 of the brush and to urge it further out of the box and into closer engagement with the commutator 10. The pressure transmitted by passage 40 thus augments the force applied by brush spring 43. There are several advantages in this particular form of the invention. First of all, the brush is urged against commutator 10 by a combination of the force produced by the brush spring 43 and the force produced by the peak fluid film pressure transmitted through passage 40 and introduced into the closed end of brush holder 42. That component of the total force resulting from the transmission of peak fluid film pressure into the closed end of the brush holder and into the space above the brush tends to be proportional to the peak fluid film pressure tending to lift the brush from the commutator. Thus, as the viscosity and/or relative velocities of the engaged brush and commutator surfaces change to produce corresponding changes in the forces tending to lift the brush from the commutator, the force tending to hold the brush against the commutator also changes. The brush spring provides a pre-loading force that is always present even when the fluid film pressure is negligible as at very low relative surface velocities between the brush and commutator and at viscosities approaching that of air.

In addition, it will be noted that by locating the hydrodynamic relief port close to trailing edge 38 and in the region which the peak fluid film pressure is encountered, the relief port acts to achieve the maximum reduction in total lifting force due to fluid film pressure. This effect is represented by pressure-magnitude-distribution curve f in FIGURE 6. Also, by transmitting this peak lifting pressure to opposite end 41 of the brush and especially to a point generally radially opposite the leading edge 39 of the brush, the peak pressure is brought to bear over a substantial area on end surface 41 directly opposite a relatively smaller area on conductor-engaging end surface 37 subjected to the peak pressure. It will be seen that there is a force amplification working against the lifting force and in favor of the force tending to hold the brush against the commutator. By inclining the pasage 40, the area radially opposite the relief port 36 is unobstructed and can be acted upon to its full extent by pressure in direct opposition to the maximum lifting pressures developed between the brush and the commutator.

The aforementioned force amplification is accomplished even though there is some loss of pressure in this mechanism and the transfer of energy from one end of the brush to the other is not complete or without loss. Among the losses is the leakage between the brush and the walls of the brush box. This leakage is not significant, however, especially at those times when the pressure transfer effect is most useful, i.e. at very low temperature and/or high viscosity conditions.

Another form of this invention is illustrated in FIGURES 7 and 8, which again are views corresponding to the views of the other pairs of figures described above. The characteristic feature of this form of invention is that the brush body 44 is provided with a hydrodynamic relief port 45 consisting of a slot extending in a radial plane with respect to commutator 10 from leading edge 46 to trailing edge 47 of brush 44 and opening onto conductor-engaging end surface portion 48 as well as outer surface portions of the brush adjacent the leading and trailing edges. Brush 44 is preferably carried by means, such as brush box 49, and urged by brush spring 50 toward and into engagement with commutator 10.

Preferably, the hydrodynamic spoiler groove or port 45 is located midway between the sides of brush 44 in the manner shown in FIGURE 8 where it is in a position to prevent the building up of the high peak pressure that otherwise occurs in this area. While it is true that other peak pressure points will occur on either side of spoiler groove or port 45, these peak pressures will be substantially less than those that would have been produced had the groove or port not been provided. Various pressure-magnitude-distribution grooves are shown in broken outline in FIGURE 7. Curve a represents the magnitude and distribution of fluid film pressure that would be present if spoiler groove or port 45 were not provided. Curves g represent the magnitude and distribution of fluid film pressure relative to curve a that is experienced when brush 44 is provided with a spoiler groove or relief port 45. The effect on the fluid film pressure by groove 45 is also graphically shown in FIGURE 8 where curve b is representative of conditions without a spoiler groove and curves h are representative of conditions when the groove is provided. It will be noted that a maximum or peak pressure is substantially reduced and that, as a result, the total lifting force is also reduced.

The groove, as well as the relief ports described above in connection with other forms, may be located at the axial center of the conductor-engaging surface of the brush or at other positions therealong so as to produce the greatest and/or desired advantage. Generally, it is preferred to locate the groove, as well as the relief ports of the other forms, at the point in and/or along the conductor-engaging surface where the fluid film pressure relief will be greatest. In some types of machines or due to axial fluid flow through the machine or for other reasons, the peak fluid film pressure may appear at some point away from the axial center of the brush.

It will be apparent that this invention comprehends various adaptations and modifications of the forms specifically shown and described. For example, the invention comprehends providing more than one relief port in the conductor-engaging end surface portion of a brush. Corresponding numbers of pressure-transmitting passages may be provided, placing the relief ports in communication with various portions of the outer surface of the brush. Relief ports may be located at points where peak lifting pressures might otherwise be experienced or at other locations. The particular shape need not necessarily be as shown in the drawings, any shape which accomplishes the purposes of this invention being suitable.

A particular modification comprehended by this invention and easily understood from the descriptions above and the accompanying drawings comprises a combination of the forms having a pressure-transmitting and -relieving passage and a spoiler groove. Such a brush, for example, has an axially central spoiler groove flanked on either side by other relief ports and associated pressure-transmitting and -relieving passages. Other arrangements will also be suggested to those skilled in the art to which this invention relates by the description above. The relief ports and/or spoiler grooves are intended to be combined and used in appropriate arrangements and numbers to provide the greatest and/or desired advantage.

Those skilled in the art will appreciate that various other changes and modifications can be made in the various and preferred forms of apparatus described herein without departing from the spirit and scope of the invention.

I claim:
1. A brush for a dynamoelectric machine comprising
   a brush body having an outer surface consisting of a first current-conducting, conductor-engaging portion bounded by a leading edge and a trailing edge and further consisting of a second portion comprising the remainder of said outer surface,
   a hydrodynamic relief port in said brush body and opening out and onto said first portion of said outer surface thereof, only nearer said trailing edge than said leading edge,
   a pressure-transmitting passage in said brush body connecting said relief port and said second portion of said outer surface for placing said relief port in communication with a pressure condition existing at a portion of said outer surface other than within said conductor-engaging portion.

2. A brush for a dynamoelectric machine comprising
   a brush body having an outer surface consisting of a first current-conducting, conductor-engaging portion and second portion comprising the remainder of said outer surface,
   a hydrodynamic relief port in said brush body and opening out and onto said first portion of said outer surface thereof,
   a pressure-transmitting passage in said brush body connecting said relief port and said second portion of said outer surface for placing said relief port in communication with a pressure condition existing at a portion of said outer surface other than within said conductor-engaging portion,
in combination with
   a brush box for telescopingly receiving and holding said brush body with a part thereof including said conductor-engaging portion of said outer surface and said relief port supported and positioned outside of said brush box and said passage connecting said relief port with that part of said second portion of said outer surface outside said brush box.

3. A brush for a dynamoelectric machine comprising
   a brush body having an outer surface consisting of a first current-conducting, conductor-engaging portion and second portion comprising the remainder of said outer surface,
   a hydrodynamic relief port in said brush body and opening out and onto said first portion of said outer surface thereof,
   a pressure-transmitting passage in said brush body connecting said relief port and said second portion of said outer surface for placing said relief port in communication with a pressure condition existting at a portion of said outer surface other than within said conductor-engaging portion,
in combination with
   a brush box having an open end for telescopingly receiving and holding said brush body with a part thereof including said conductor-engaging portion of said outer surface and said relief port supported and positioned outside of said brush box, said brush box having a ported end generally opposite said open end, said passage placing said relief port in communication with said ported end of said brush box.

4. A brush for a dynamoelectric machine comprising
   a brush body having an outer surface consisting of a first current-conducting, conductor-engaging portion and second portion comprising the remainder of said outer surface,
   a hydrodynamic relief port in said brush body and opening out and onto said first portion of said outer surface thereof,
   a pressure-transmitting passage in said brush body connecting said relief port and said second portion of said outer surface for placing said relief port in communication with a pressure condition existing at a portion of said outer surface other than within said conductor-engaging portion,
in combination with
   a brush box having a closed end and an open end for telescopingly receiving and holding said brush body with a part thereof including said conductor-engaging portion of said outer surface and said relief port supported and positioned outside of said brush box and with a part of said brush body supported and positioned within said brush box and away from said closed end to provide at said closed end of said brush box a chamber closed by said brush, said pressure-transmitting passage extending between said relief port and said closed chamber in said brush box to place said chamber in communication with pressure conditions at said relief port.

References Cited
UNITED STATES PATENTS 1,495,780  5/1924  Eschholz et al. _____ 310—232

FOREIGN PATENTS 460,800  2/1937  Great Britain.

MILTON O. HIRSHFIELD, *Primary Examiner.*

D. F. DUGGAN, *Assistant Examiner.*